United States Patent
Chokshi

(10) Patent No.: US 12,039,656 B2
(45) Date of Patent: Jul. 16, 2024

(54) USER AUTHENTICATION AND AUTOMATIC CAPTURE OF TRAINING DATA

(71) Applicant: Roblox Corporation, San Mateo, CA (US)

(72) Inventor: Palak Chokshi, San Ramon, CA (US)

(73) Assignee: Roblox Corporation, San Mateo, CA (US)

( * ) Notice: Subject to any disclaimer, the term of this patent is extended or adjusted under 35 U.S.C. 154(b) by 187 days.

(21) Appl. No.: 17/865,708

(22) Filed: Jul. 15, 2022

(65) Prior Publication Data
US 2024/0020907 A1 Jan. 18, 2024

(51) Int. Cl.
| | |
|---|---|
| *G06T 15/00* | (2011.01) |
| *G06T 17/10* | (2006.01) |
| *G06T 19/00* | (2011.01) |
| *G06V 20/64* | (2022.01) |

(52) U.S. Cl.
CPC ............ *G06T 15/005* (2013.01); *G06T 17/10* (2013.01); *G06T 19/006* (2013.01); *G06V 20/647* (2022.01)

(58) Field of Classification Search
CPC .... G06N 3/08; G06V 10/7715; G06V 10/774; G06V 20/647; G06V 20/95; G06T 15/005; G06T 15/20; G06T 17/10; G06T 19/006; G06T 2200/24
USPC ......................................................... 345/633
See application file for complete search history.

(56) References Cited

U.S. PATENT DOCUMENTS

| 10,402,553 B1* | 9/2019 | Johnson ................. G06V 40/20 |
|---|---|---|
| 2013/0015946 A1* | 1/2013 | Lau ....................... G06V 40/172 340/5.2 |
| 2013/0051647 A1* | 2/2013 | Miao ....................... G06T 7/344 382/128 |
| 2015/0139535 A1* | 5/2015 | Siddiqui .............. G06V 10/772 382/154 |
| 2017/0199994 A1* | 7/2017 | Shalev .................... G06F 21/31 |

OTHER PUBLICATIONS

"Deep Learning 3D model classification", Retrieved from Internet: http://3ddl.stanford.edu/CVPR17_Tutorial_MVCNN_3DCNN_v3.pdf, 2017, 69 pages.

Dey, et al., "Eigen Deformation of 3D Models", The Visual Computer 28.6, 2012, 10 pages.

(Continued)

*Primary Examiner* — Jacinta M Crawford
(74) *Attorney, Agent, or Firm* — IP Spring

(57) ABSTRACT

Some implementations relate to methods, systems, and computer-readable media for automatically capturing training data. In some implementations, a computer-implemented method includes generating a respective set of descriptors based on content identified in a 3D model, presenting, in a user interface, the 3D model and two or more descriptors, receiving, from the user interface, at least one selection from the two or more descriptors, authenticating a user based on the at least one selection, and modifying a weight of at least one descriptor associated with the at least one selection for an associated 2D image in a labeled training set for an artificial intelligence (AI) model.

20 Claims, 9 Drawing Sheets

(56) References Cited

OTHER PUBLICATIONS

Huang, et al., "MeshODE: a Robust and Scalable Framework for Mesh Deformation", arXiv preprint arXiv:2005.11617, 2020, 20 pages.
Riegler, et al., "OctNet: Learning Deep 3D Representations at High Resolutions", Proceedings of the IEEE conference on computer vision and pattern recognition, 2017, 10 pages.
Su, et al., "Multi-view Convolutional Neural Networks for 3D Shape Recognition", Proceedings of the IEEE International conference on computer vision, 2015, 9 pages.
Wu, et al., "3D ShapeNets: a Deep Representation for Volumetric Shapes", Proceedings of the 28th IEEE Conference on Computer Vision and Pattern Recognition (CVPR2015), retrieved from Internet: https://3dshapenets.cs.princeton.edu/papen.pdf, 2015, 9 pages.
Zhu, et al., "3D Deformation Using Moving Least Squares", Retrieved from Internet: https://dash.harvard.edu/bitstream/handle/1/24947963/tr-10-07.pdf?sequence=1&isAllowed=y, 2007, 7 pages.

* cited by examiner

USER AUTHENTICATION AND AUTOMATIC CAPTURE OF TRAINING DATA

TECHNICAL FIELD

Embodiments relate generally to online virtual experience platforms, and more particularly, to methods, systems, and computer readable media to authenticate a user and capture artificial intelligence training data and other data from 3D models used for the user authentication.

BACKGROUND

Online platforms, such as virtual experience platforms and online gaming platforms, generally provide tools for creation, upload, and storage of 3D models. The 3D models may include a title and description text, for example, to help in identifying the content of the 3D models. While titles and descriptions are generally considered accurate, the text may be contextual or subjective in its description.

For example, a model for a chair and/or table may be described as a type of table or intended use (e.g., dining, breakfast, coffee, etc.). Such descriptions may be sufficient for human identification but may lack more generic labels or details that may be useful in machine learning and training. An artist or developer may sometimes intentionally mislabel a 3D model in order to circumvent automatic filtering of objectionable content (e.g., labeling a weapon as a tool, labeling a loot box as briefcase, etc.). Example embodiments are presented herein that overcome these and other drawbacks.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of this disclosure are directed to methods, systems, and computer readable media to authenticate a user and to automatically capture artificial intelligence training data and other data from 3D models.

According to an aspect, a computer-implemented method is disclosed comprising: generating a plurality of two-dimensional (2D) images from a three-dimensional (3D) model of an object; generating a respective set of descriptors for each 2D image of the plurality of 2D images, wherein the respective set of descriptors is based on content identified in the associated 2D image; presenting, in a user interface, the 3D model and two or more descriptors, wherein the two or more descriptors include at least first descriptors from at least one of the respective sets of descriptors and at least a second descriptor not in any of the respective sets of descriptors; receiving, from the user interface, at least one selection from the two or more descriptors; authenticating the user based on the at least one selection; and modifying a weight of at least one descriptor associated with the at least one selection for an associated 2D image in a labeled training set for an artificial intelligence (AI) model.

In some implementations, generating the respective set of descriptors comprises generating, with an image recognition algorithm, the respective set of descriptors, wherein the computer-implemented method further comprises: receiving, as output from an image recognition algorithm, a confidence metric associated with descriptors of the respective sets of descriptors; and selecting the at least the first descriptors from at least one of the respective sets of descriptors based on the confidence metric of each of the at least first descriptors meeting a threshold.

In some implementations, the computer-implemented method further comprises: applying weights to each descriptor of the respective sets of descriptors based on respective confidence metrics, wherein the applied weights are normalized numerical values within a predefined range.

In some implementations, the computer-implemented method further comprises: calculating a similarity index between the first 3D model and one or more additional 3D models based on the applied weights; and selecting the at least the first descriptors based on the similarity index.

In some implementations, presenting the 3D model and the two or more descriptors comprises: deforming the 3D model to alter at least one aspect of an appearance of the 3D model prior to presenting the 3D model.

In some implementations, the object is a virtual object that can be deployed in a virtual environment.

In some implementations, generating the plurality of two-dimensional (2D) images from the three-dimensional (3D) model of the object comprises generating each 2D image based on a respective viewing angle from which the 3D model of the object is viewed.

In some implementations, the 3D model comprises one or more 3D features, and wherein the one or more 3D features comprise one or more of: a texture or a mesh.

In some implementations, the receiving the at least one selection is responsive to an authentication request for a user.

In some implementations, modifying the weight of the at least one descriptor comprises: determining that the at least one selection is a correct descriptor; and applying a new weight to the correct descriptor.

In some implementations, determining that the at least one selection is the correct descriptor comprises: storing a plurality of selections received from a plurality of users viewing the 3D model; and determining that the at least one selection is correct if the at least one selection matches at least a threshold number of the stored plurality of selections.

In some implementations, the AI model is trained to generate descriptors for 3D models by using the labeled training set.

In some implementations, the computer-implemented method further comprises: providing a plurality of 3D models to the AI model, each 3D model associated with a respective object associated with a virtual experience; receiving a plurality of virtual experience descriptors for the virtual experience as an output from the AI model, wherein the AI model generates the plurality of virtual experience descriptors based on the plurality of 3D models; and matching the plurality of virtual experience descriptors to identify different virtual experiences from a virtual experience platform having similar descriptors.

In some implementations, the computer-implemented method further comprises one or more of: assigning an age-specific content rating associated with the virtual experience based on the matching; restricting access to the virtual experience based on the matching; flagging the virtual experience for administrator review based on the matching; adjusting a search ranking of the virtual experience based on the matching; or assigning a classification to the virtual experience based on the matching.

In some implementations, each descriptor is descriptive of at least one of: a shape of the 3D model, color of the 3D model, material of the 3D model, classification of the 3D model, or a type of object represented by the 3D model.

According to another aspect, a system is disclosed, comprising: a memory with instructions stored thereon; and a processing device, coupled to the memory, the processing device configured to access the memory, wherein the instructions when executed by the processing device, cause the processing device to perform operations including: generating a plurality of two-dimensional (2D) images from a three-dimensional (3D) model of an object; generating a respective set of descriptors for each 2D image of the plurality of 2D images, wherein the respective set of descriptors is based on content identified in the associated 2D image; presenting, in a user interface, the 3D model and two or more descriptors, wherein the two or more descriptors include at least first descriptors from at least one of the respective sets of descriptors and at least a second descriptor not in any of the respective sets of descriptors; receiving, from the user interface, at least one selection from the two or more descriptors; authenticating the user based on the at least one selection; and modifying a weight of at least one descriptor associated with the at least one selection for an associated 2D image in a labeled training set for an artificial intelligence (AI) model.

In some implementations, generating the respective set of descriptors comprises generating, with an image recognition algorithm, the respective set of descriptors, and wherein the operations further comprise: receiving, as output from an image recognition algorithm, a confidence metric associated with descriptors of the respective sets of descriptors; and selecting the at least the first descriptors from at least one of the respective sets of descriptors based on the confidence metric of each of the at least first descriptors meeting a threshold.

In some implementations, the operations further comprise: applying weights to each descriptor of the respective sets of descriptors based on respective confidence metrics, wherein the applied weights are normalized numerical values within a predefined range.

In some implementations, the operations further comprise: calculating a similarity index between the first 3D model and one or more additional 3D models based on the applied weights; and selecting the at least the first descriptors based on the similarity index.

According to another aspect, a non-transitory computer-readable medium is disclosed, with instructions stored thereon that, responsive to execution by a processing device, causes the processing device to perform operations comprising: generating a plurality of two-dimensional (2D) images from a three-dimensional (3D) model of an object; generating a respective set of descriptors for each 2D image of the plurality of 2D images, wherein the respective set of descriptors is based on content identified in the associated 2D image; presenting, in a user interface, the 3D model and two or more descriptors, wherein the two or more descriptors include at least first descriptors from at least one of the respective sets of descriptors and at least a second descriptor not in any of the respective sets of descriptors; receiving, from the user interface, at least one selection from the two or more descriptors; authenticating the user based on the at least one selection; and modifying a weight of at least one descriptor associated with the at least one selection for an associated 2D image in a labeled training set for an artificial intelligence (AI) model.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
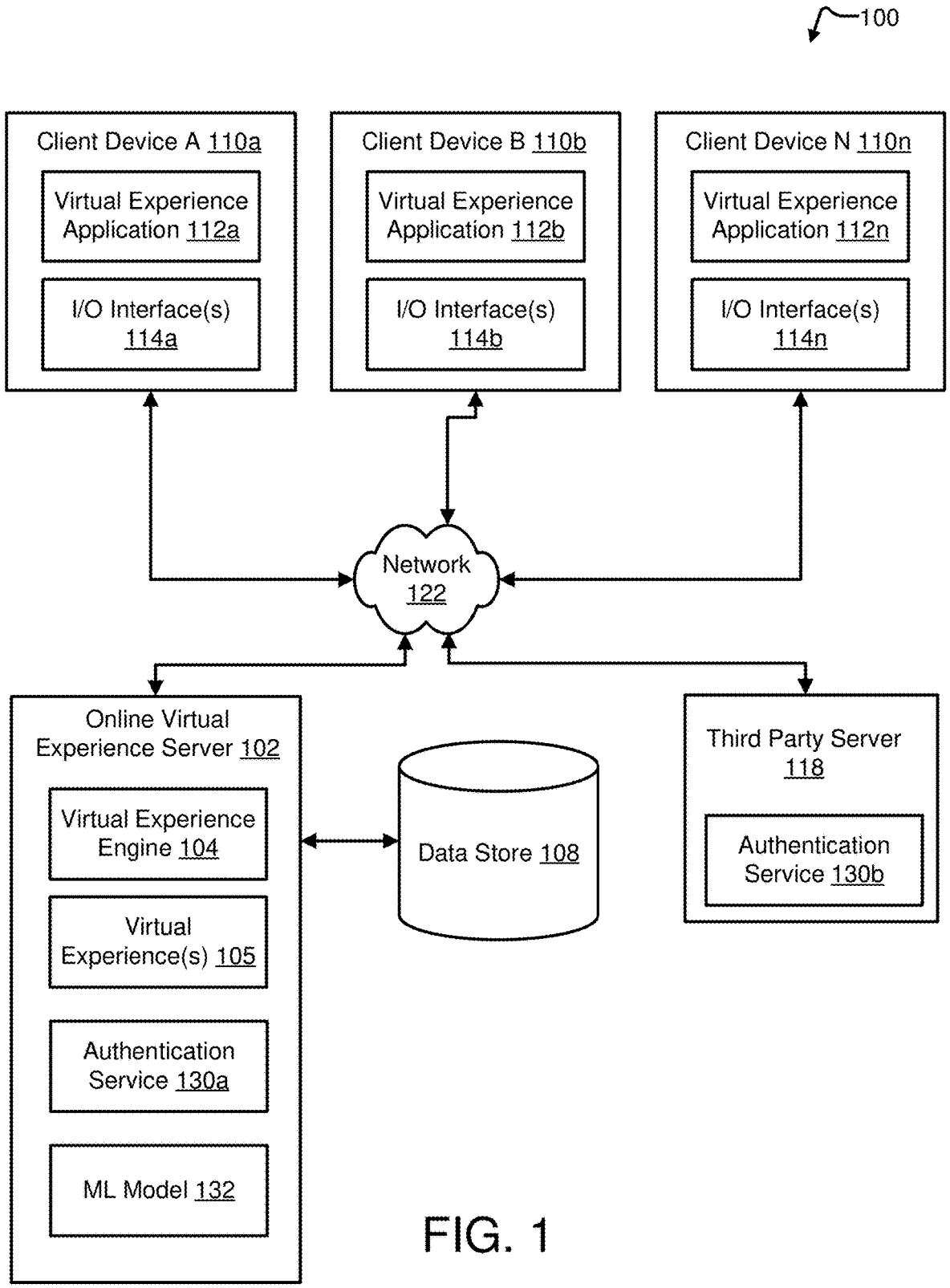
FIG. 1 is a diagram of an example network environment, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

In some aspects, systems and methods are provided to automatically capture training data. The captured training data may be used to train artificial intelligence (AI) models, machine learning (ML) models, and/or other suitable computer-executable models configured to receive training data. Online platforms, such as online virtual experience platforms, generally provide an ability to create, store, edit, and otherwise manipulate virtual objects to be used in virtual experiences.

For example, virtual experience platforms may include user-generated content or developer-generated content (each referred to as "UGC" herein). The UGC may be stored and implemented through the virtual experience platform, for example, by allowing users to search and interact with various virtual experiences. Often, virtual experiences and their classification into appropriate demographic-based classifications are reliant upon accurate descriptors for associated UGC. For example, a developer may create a three-dimensional (3D) model for use in a virtual environment of a virtual experience. Depending upon content identified in the 3D model (e.g., weapons, loot, hats, accessories, etc.), the 3D model may be classified into an appropriate age-based classification (e.g., suitable for all ages, suitable for young children, suitable for adolescents, suitable for adults, etc.). Additionally, content identified in the 3D model may also be classified based on an intended or targeted audience or locale (e.g., American audiences, Canadian audiences, etc.).

The virtual experience platform may provide and/or implement automated or semi-automated techniques for automatic classification of content based on demographics and/or locales, and/or may classify certain virtual experiences based on suitability for advertising, public announcements, and for different uses. It follows that as the size and complexity of virtual experiences increases, a number of virtual objects being classified increases, as well. Furthermore, accuracy of the automatic classification becomes increasingly relevant as semi-automated techniques become cumbersome or difficult.

Similarly, when a user attempts to join or "log in" to a virtual experience platform, the virtual experience platform may attempt to verify and/or authenticate the user. The authentication may be useful in determining that the user is of a suitable age and/or demographic to access particular virtual experiences, that the user is not a restricted person having restrictions on use of the platform, that the user is a paying or public (e.g., free) customer, that the user is actually a human user and not a "bot," and other verification determinations. Such authentication can be performed, e.g., using a CAPTCHA (Completely Automated Public Turing test to tell Computers and Humans Apart).

According to implementations and embodiments described herein in detail, an online virtual experience platform may leverage both automated classification techniques and a user authentication process to bolster and/or automatically capture training data based on user-generated content, 3D models, and other 3D content. For example, the online virtual experience platform may present 3D models to both: authenticate a user; and receive user selections that can further be used to alter weights of labeled training data, create new labeled training data, and other suitable uses, as will become apparent in this disclosure.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a," "110b," and/or "110n" in the figures).

The network environment 100 (also referred to as a "platform" herein) includes an online virtual experience server 102, a data store 108, a client device 110 (or multiple client devices), and a third party server 118, all connected via a network 122.

The online virtual experience server 102 can include, among other things, a virtual experience engine 104, one or more virtual experiences 105, an authentication service 130a, and at least one ML model 132. The online virtual experience server 102 may be configured to provide virtual experiences 105 to one or more client devices 110, and to receive authentication requests at the authentication service 130a, in some implementations. Furthermore, as will be described more fully below, the ML model 132 may also receive training data that is automatically captured through at least the authentication service 130a.

Data store 108 is shown coupled to online virtual experience server 102 but in some implementations, can also be provided as part of the online virtual experience server 102. The data store may, in some implementations, be configured to store authentication data, labeled training data, and/or other training data in association with the ML model 132.

The client devices 110 (e.g., 110a, 110b, 110n) can include a virtual experience application 112 (e.g., 112a, 112b, 112n) and an I/O interface 114 (e.g., 114a, 114b, 114n), to interact with the online virtual experience server 102, and to view, for example, graphical user interfaces (GUI) through a computer monitor or display (not illustrated). In some implementations, the client devices 110 may be configured to execute and display virtual experiences, as well as provide authentication information to a user, transmit authentication requests on behalf of the user, and automatically capture training data as described herein.

Third party server 118 may include an authentication service 130b. In some implementations, the third party server 118 and/or authentication service 130b may operate optionally instead of the authentication service 130a. In some implementations, the third party server 118 and/or authentication service 130b may operation in combination with the authentication service 130a. Furthermore, in some implementations, the third party server 118 and/or authentication service 130b may be configured to receive authentication requests and provide authentication data to the online virtual experience server 102. Moreover, both the authentication service 130a and 130b may be referred to as an authentication service 130 herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 and/or the third party server 118 can include a server having one or more computing devices (e.g., a cloud computing system, a rackmount server, a server computer, cluster of physical servers, virtual server, etc.). In some implementations, a server may be included in the online virtual experience server 102 and/or the third party server 118, be an independent system, or be part of another system or platform. In some implementations, the online virtual experience server 102 and/or the third party server 118 may be a single server, or any combination a plurality of servers, load balancers, network devices, and other components. The online virtual experience server 102 and/or the third party server 118 may also be implemented on physical servers, but may utilize virtualization technology, in some implementations. Other variations of the online virtual experience server 102 and the third party server 118 are also applicable.

In some implementations, the online virtual experience server 102 and/or the third party server 118 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (e.g., user 114 via client device 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, each client device 110 may include an instance of the virtual experience application 112. The virtual experience application 112 may be rendered for interaction at the client device 110. During user authentication and/or user verification, the example methods disclosed herein may automatically capture training data for the ML model 132 while authenticating and/or verifying the user. In this manner, a user of client device 110 may readily provide training data that can be input to the ML model, to aid in training of the ML model 132. Technical effects and benefits of this approach include reduced computational costs associated with creating training datasets, reduced labor associated with creating training datasets, reduced labor associated with verifying new training datasets, decreased power consumption through increased efficiency, increased developer engagement through improved capturing of new training data, and increased user engagement with verification/authentication processes.

Figure 2:
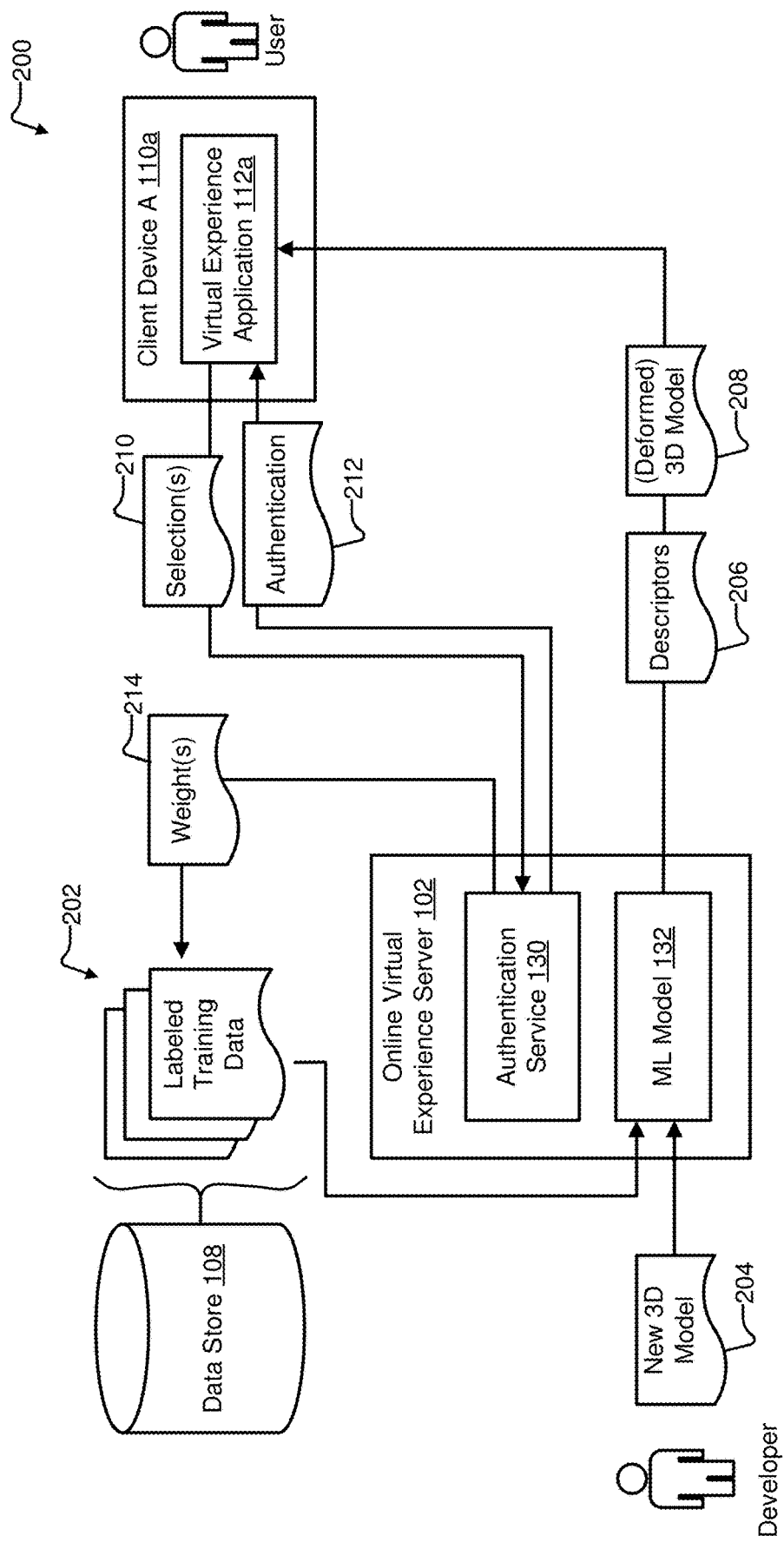
FIG. 2 is a flow diagram of an example system architecture to automatically capture training data, in accordance with some implementations.

FIG. 2: Flow Diagram of Capturing Training Data

FIG. 2 is a flow diagram of an example system architecture 200 to automatically capture training data, in accordance with some implementations.

The system architecture 200 (also referred to as a "subsystem" herein) includes the online virtual experience server 102, authentication service 130 (e.g., authentication services 130a and 130b), an example ML model 132, and client device 110 executing virtual experience 112. Online virtual experience server 102 and client device 110 may be arranged as described above with reference to FIG. 1, namely, in operative communication over network 122 (not illustrated here for clarity). Furthermore, although not explicitly illustrated, it should be understood that authentication service 130b may also provide authentication data in some implementations.

As illustrated, a set of labeled training data 202 may be stored at data store 108. The labeled training data 202 may be used in training of ML model 132, in some implementations. The labeled training data 202 may include a plurality of labeled images that are representative of several distinct views of a 3D model that can be deployed in a virtual experience by the virtual experience server 102.

In one example, a developer may create a new 3D model 204 of a virtual item or object for use in a virtual experience. The 3D model 204 may be provided as input to the ML model 132.

The ML model 132 may take as input the 3D model 204 and generate a plurality of two-dimensional (2D) images from the 3D model. For example, the ML model 132 may generate a 2D image based on a respective viewing angle from which the 3D model is viewed. In some implementations, the 3D model includes one or more 3D features such as textures and mesh, and may also include varying features such as colors and other features. The training dataset of 2D images may include six or more 2D images of a 3D model (e.g., front, back, left, right, top, bottom). These images are related to the 3D model. The 3D model and the images are then used as input to one or more ML models to train the ML models to recognize the 3D model or features of the 3D model e.g. color, texture, shape, etc.

Thereafter, the ML model may generate a respective set of descriptors for each 2D image of the generated 2D images. In addition to generating a set of descriptors for each 2D image of the 3D model, the ML model will also generate an aggregate set of descriptors for the 3D model itself. For example, the set of descriptors of each 2D image may be based on content identified in the 2D image. For example, an embedding or feature vector may be generated by the ML model based on the 2D image and a descriptor may be obtained based on the embedding/feature vector. The descriptors may by descriptive of at least one or more of the shape, color, material, classification, or type of the 3D model 204.

In some implementations, the ML model 132 may be configured to provide, as output, a confidence metric associated with each generated descriptor based on the 2D images of the 3D model 204. In some implementations, a separate image recognition algorithm may be used. In some implementations, the confidence metric applies to descriptors of the 2D images as well as the 3D model.

In some implementations, weights may be applied to each generated descriptor based on the confidence metric. For example, if a separate image recognition algorithm is used to identify content of the 2D images (e.g., a 2D image recognition algorithm), the output confidence metric may be used to generate a new weight to be applied to each descriptor. In at least one implementation, the applied weights are normalized numerical values based upon the confidence metrics, and within a predefined range.

Using the weights, for example, the generated descriptors may be ranked or sorted. Through ranking (or otherwise organizing) the generated descriptors, the ML Model 132 may automatically choose descriptors exceeding a weight threshold. For example, the ML model 132 may provide, as output, two or more descriptors 206 having a weight exceeding the threshold, and the 3D model 204 (or a deformed version 208), for display at a user interface of the client device 110.

The two or more descriptors 206 may be selected from the generated descriptors and other descriptors for similar 3D models. For example, a similarity index may be calculated between the 3D model 204 and other 3D models. Subsequently, the two or more descriptors 206 may be selected based on the weights and similarity index. Alternatively, the two or more descriptors 206 may be selected based only on the confidence metric and/or weights. However, in at least one implementation, the two or more descriptors include at least one descriptor not in the generated set of descriptors (e.g., a false descriptor). It is noted that the false descriptor may be used in authenticating a user, as described herein.

Upon presentation of the two or more descriptors 206 and the 3D model 204 (or deformed model 208) to a user, the user may select one or more descriptors as being related to the 3D model using a GUI presented at the client device 110. The GUI may present the 3D model and the descriptors in a selectable manner, such that the user may readily select the appropriate descriptors and request authentication. Additionally, the 3D model or a 2D representation of the 3D model may be presented by the GUI.

The requested authentication may be in the form of a "log in" request to access the online virtual experience platform 100, in some implementations. In this manner, a user's selections 210 may be provided to the authentication service 130 (or 130b), and an authentication response 212 may be provided to the client device 110.

The selections 210 may be used to authenticate the user by comparing the selections 210 against a number of stored prior selections from a plurality of users, or against a groundtruth obtained in another manner. Accordingly, if the selections 210 exceed a threshold number of prior stored selections, it may be determined that the user can be authenticated. However, if the selections 210 are incorrect or below a threshold, the user may be refused authentication in some implementations. In some implementations, if the selections 210 are below a threshold, an additional authentication process may be provided, login credentials may be used in lieu of selections 210, or other suitable authentication techniques may be used.

Upon receipt of the selections 210 and authenticating the user, the selections 210 may be used by the online virtual experience server 102 and/or the authentication service 130 to provide weights 214 for the labeled training data 202. For example, weights 214 may be new weights or altered weights of descriptors in the labeled training data 202. The weights 214 may be used to adjust and retrain the ML model 132 such that future training iterations provide improved descriptors of 3D models (e.g., 3D model 204).

The descriptors generated by the ML model 132 may be used in a many ways, including, for example, in classification of virtual experiences that employ the 3D model 204. Additionally, the descriptors may be used in comparisons and/or matching with existing virtual experiences to improve automatic classification of virtual experiences that employ the 3D model 204.

For example, the descriptors may be used to identify a plurality of other, classified virtual experiences. For example, the plurality of virtual experience descriptors may be used to identify different virtual experiences from a virtual experience platform having similar descriptors (e.g., by matching the descriptors). Thereafter, based upon the existing classifications and the matching, the first virtual experience may be classified automatically. Additionally, the first virtual experience, through the matching of the descriptors, may be automatically assigned an age-specific rating, have access restricted, by flagged, have a search ranking adjusted, or be assigned a new or different classification. Other similar activities may be facilitated through matching of the descriptors and comparisons with existing virtual experiences. In this manner, descriptors, training data, and/or classifications that are stored in the data store 108 may be used to improve automatic user authentication as well as automatic classification.

Hereinafter, example data structures useful in storing authentication data and/or training data are described in detail below with reference to FIG. 3.

Figure 3:
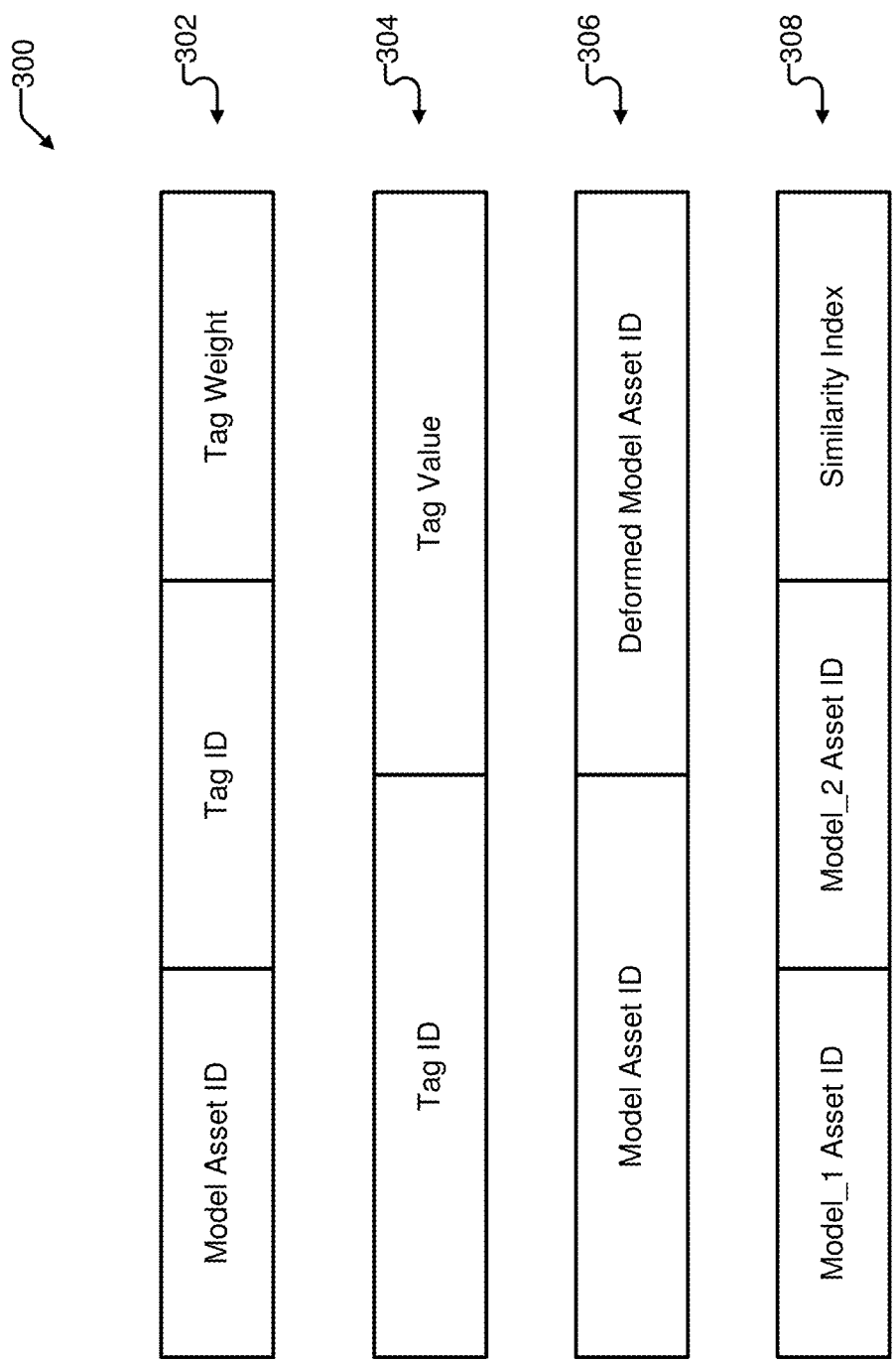
FIG. 3 is a schematic of example data structures associated with automatically captured training data, in accordance with some implementations.

FIG. 3: Stored Data

FIG. 3 is a schematic of example data structures 300 associated with automatically captured training data, in accordance with some implementations. It is noted that the description provided in reference to FIG. 3 is illustrative only, and not limiting. For example, actual database entries may include more or fewer data than illustrated, may be organized differently, or several structures may be optionally combined.

A first example data structure 302 may include a Model Asset ID, a Tag ID, and Tag Weight. For example, the Model Asset ID may be an ID used in identifying a particular 3D model. For example, the Tad ID may be an ID used in identifying a particular descriptor used to described the 3D model. For example, the Tag Weight may be a weight for the descriptor, as assigned by the authentication service 130, authentication service 130b, and/or another component of the virtual experience server 102.

A second example data structure 304 may include a Tag ID and a Tag Value. For example, the Tag ID is similar to that described above. For example, the Tag Value may be a text variable for storing an actual descriptor. The actual descriptor may then be accessed and provided to a user via a GUI.

A third example data structure 306 may include a Model Asset ID and a Deformed Model Asset ID. For example, the Model Asset ID may be similar to that described above. For example, the Deformed Model Asset ID may be an ID used in identifying a particular deformed version of a particular 3D model. In this manner, deformed versions of 3D models may be easily matched to original, non-deformed versions and associated descriptors.

A fourth example data structure 308 may include a first Model Asset ID, a second Model Asset ID, and a Similarity Index. For example, the Model Asset IDs may be similar to those described above, and may identify different particular 3D models. For example, the Similarity Index may be a value, score, or index representative of the similarity between the first and second 3D models identified by the Model Asset IDs.

As shown, a plurality of data associated with 3D models, descriptors, training data, and associated weights/similarities may be captured and stored in the data store 108.

Hereinafter, a graphical user interface (GUI) for automatically capturing training data is described with reference to FIG. 4.

Figure 4:
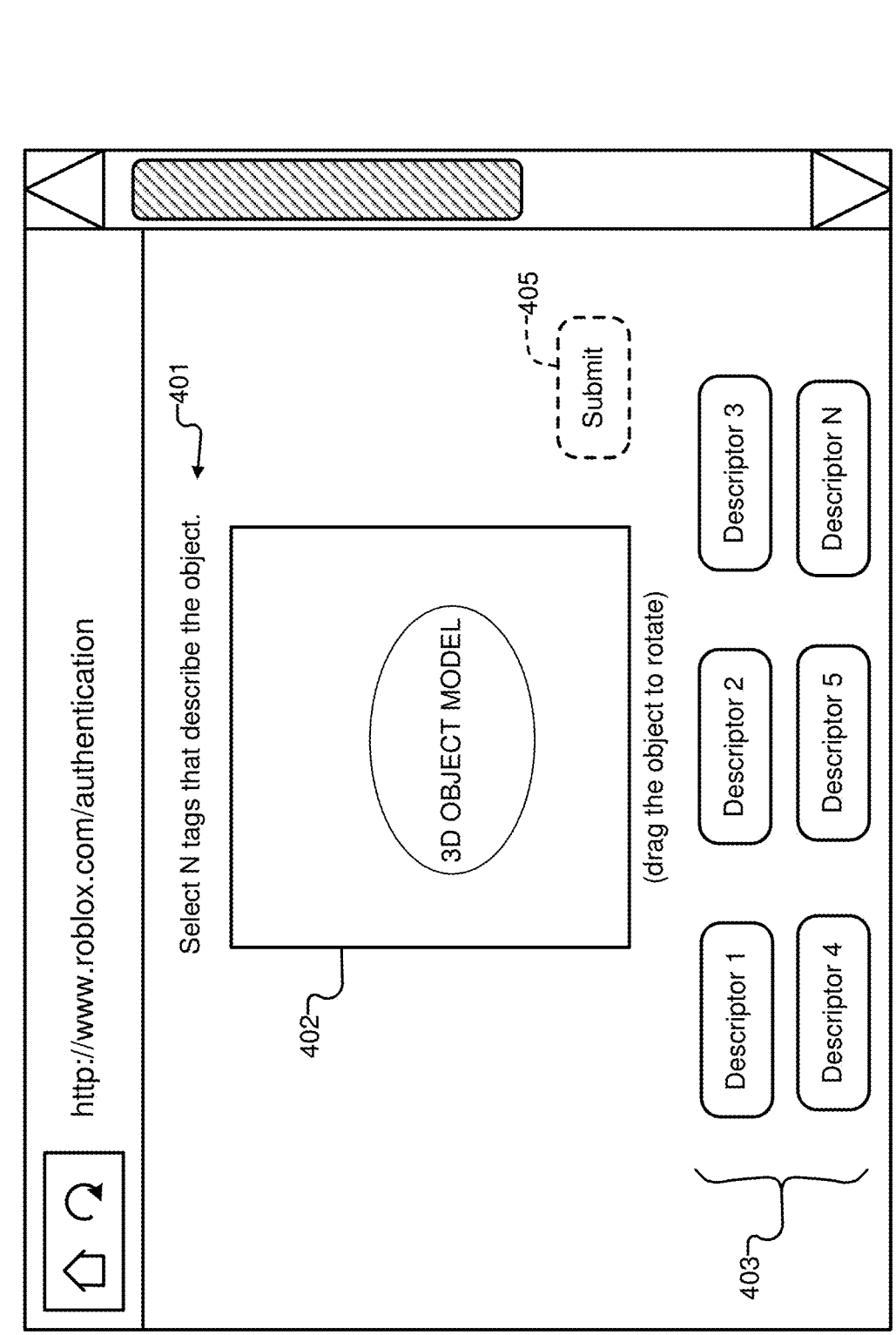
FIG. 4 is a schematic of a graphical user interface for automatically capturing training data, in accordance with some implementations.

FIG. 4: Graphical User Interface

FIG. 4 is a schematic of an example graphical user interface (GUI) 400 to automatically capture training data for a virtual experience platform 100, in accordance with some implementations. The GUI 400 may be varied in form and/or number of displayed interface elements. Accordingly, the illustrated example GUI 400 is not limiting of all implementations.

The GUI 400 may include a main portion 401 having brief instructions displayed to a user. For example, the main portion 401 may include text that instructs a user to select one or more descriptors that are associated with a 3D object model 402 displayed for a user.

The GUI 400 may further include two or more descriptors 403 provided for selection by a user. In one implementation, if a user selects or "clicks on" a descriptor, the associated user interface element may be highlighted, grayed out, or otherwise altered to indicate its selection. In one implementation, if a user selects a descriptor that has already been selected, the selection is removed, for example, by reversing the change described above.

The GUI 400 may further include a submission/authentication button 405. The submission button 405 may transmit the selections to the online virtual experience server 102 and/or authentication service 130. In one implementation, the selection of the submission button 405 changes the display of the GUI 400 to visually signal to the user that the authentication request has been accepted or rejected. In one implementation, there is a delay after the selection of the submission button 405 to signal to the user that an authentication is in process. In some implementations, if a user cannot be authenticated through the selections 403, then an alternative authentication procedure may be presented at the GUI 400. Other variations are also applicable.

It is noted that as the 3D model 402 is a three-dimensional representation (or a pseudo-three-dimensional rendering) of a virtual item associated with the virtual experience platform 100, the user may manipulate the display of the 3D model by panning, rotating, or otherwise manipulating the display of the 3D model. In this manner, even if an initial perspective view of the 3D model makes it difficult to ascertain content of the 3D model 402, a user may alter this perspective prior, during, and after selection of the descriptors 403.

Hereinafter, a more detailed description of a 3D model for display in a GUI is provided with reference to FIG. 5.

Figure 5:
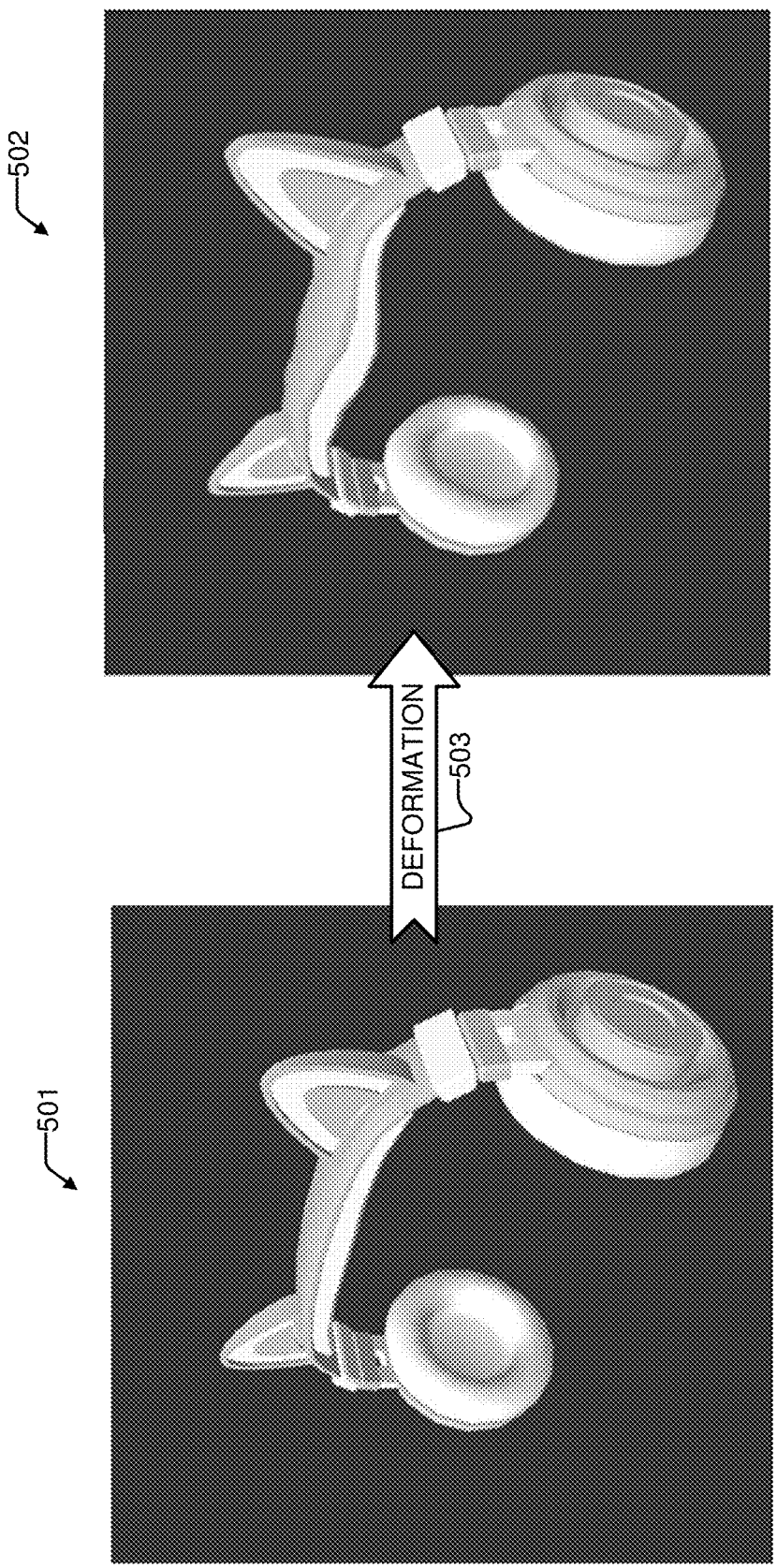
FIG. 5 is a diagram showing deformation of a 3D model, in accordance with some implementations.

FIG. 5: 3D Models and Deformation

FIG. 5 is a flow diagram showing deformation of a 3D model, in accordance with some implementations. As illustrated, an initial 3D model 501 may be created by a developer or user for use in a virtual experience provided by the virtual experience platform 100. Accordingly, the 3D model 501 may represent UGC for use in a virtual experience.

In the example 501, a set of headphones having cat-like ears disposed thereon has been created for use with an avatar as a clothing accessory. While it may be relatively easy for some ML models to identify ear-pieces and a connecting headband to classify the example 501 as a pair of headphones or a clothing accessory to be worn on a head of an avatar, in order to create more robust training data the example model 501 may be deformed through deformation step 503 create deformed example model 502.

In the example 502, the set of headphones may be relatively more difficult for a ML model to classify as a clothing accessory or pair of headphones due to the deformation of a central band portion. Accordingly, while a user being authenticated by the authentication service 130 or 130b may readily associate the example 502 with the example 501, the ML model 132 may not. Therefore, by using newly weighted descriptors provided by the user through the GUI 400, newly captured training data may be used to retrain the ML model 132 to better associate the features of example 502 with the example 501.

Hereinafter, example GUIs showing displays of the examples 501 and 502 are provided with reference to FIGS. 6A and 6B.

Figure 6A:
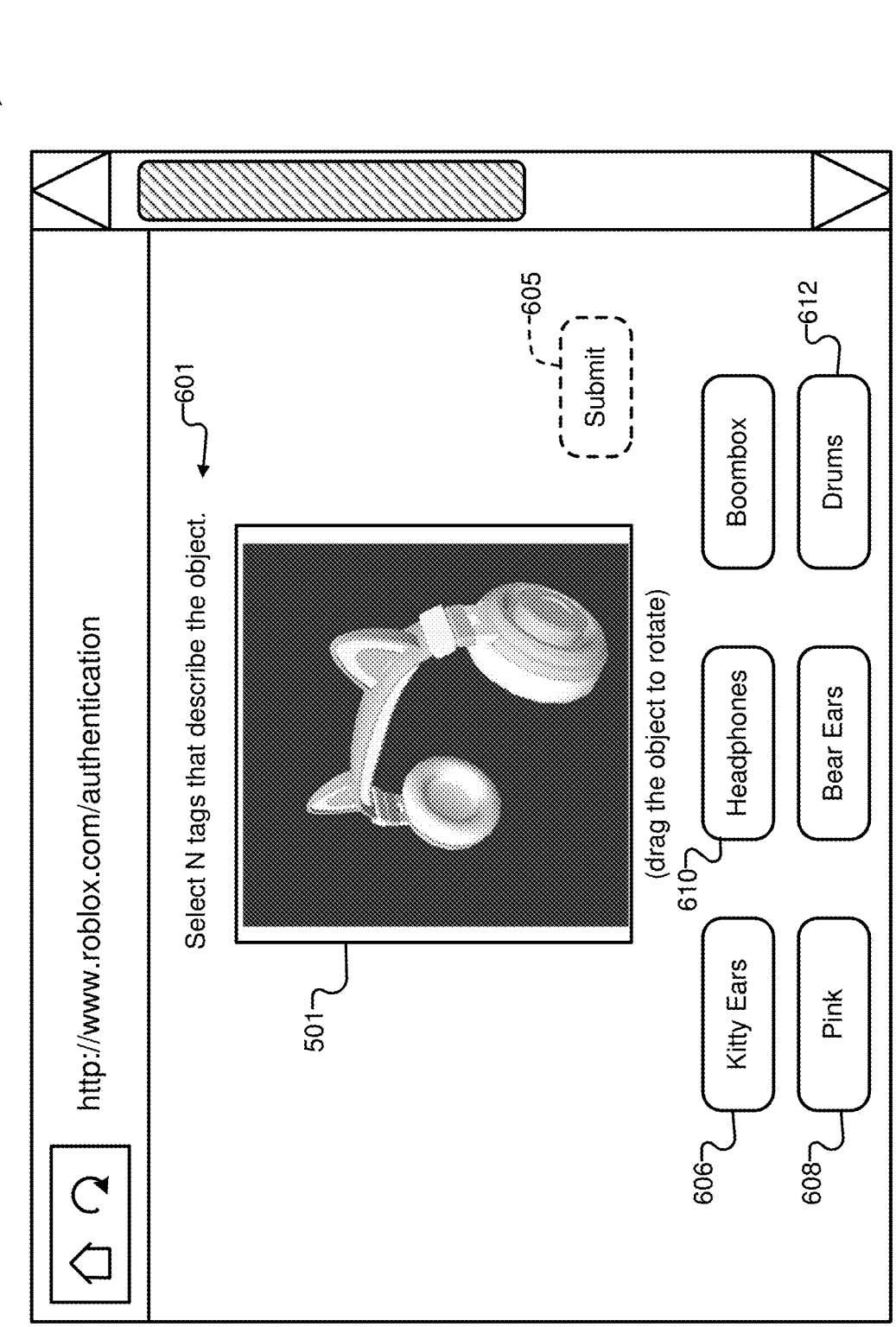
FIG. 6A is a schematic of a graphical user interface for automatically capturing training data based on an initial 3D model, in accordance with some implementations.
Figure 6B:
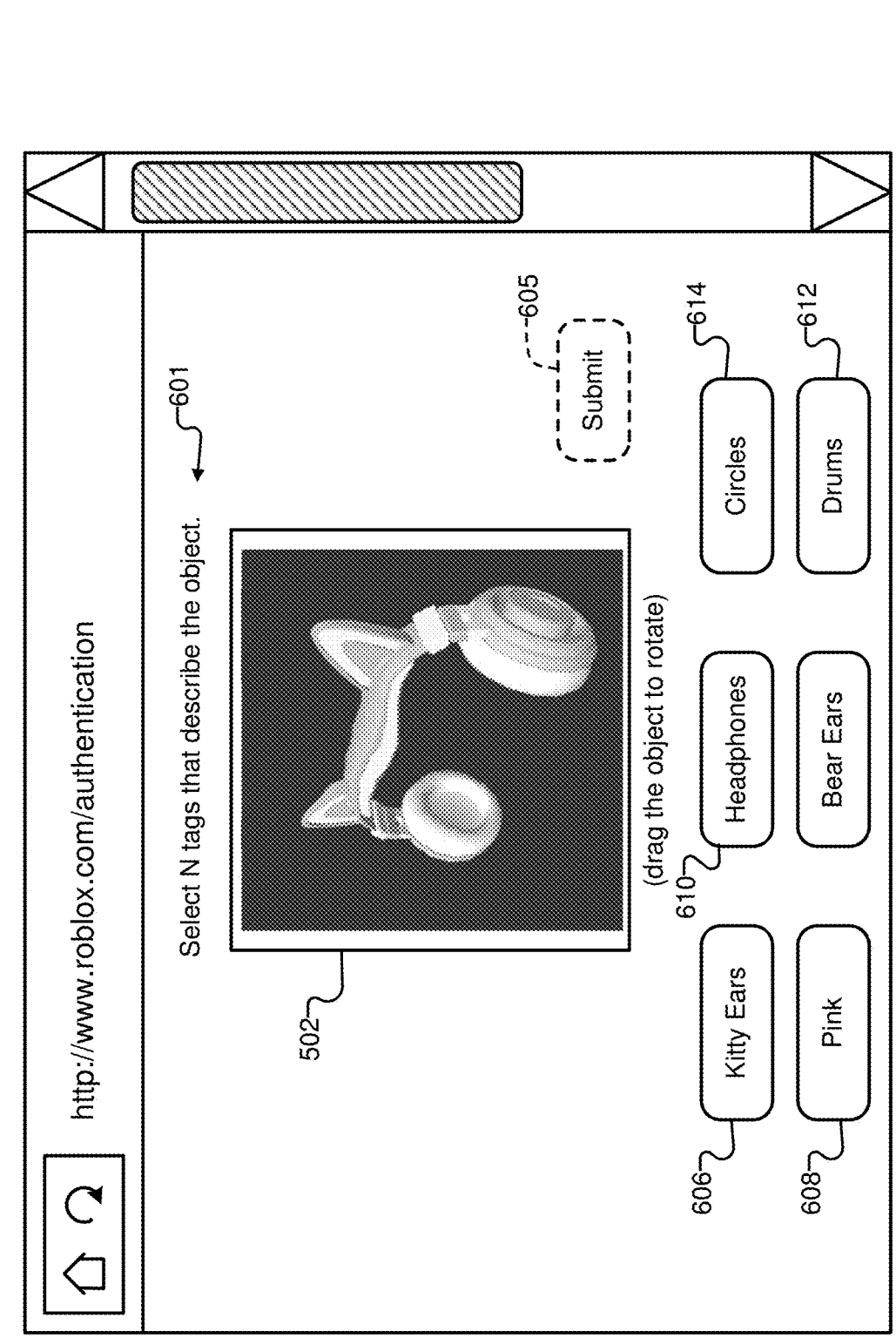
FIG. 6B is a schematic of a graphical user interface for automatically capturing training data based on a deformed 3D model, in accordance with some implementations.

FIGS. 6A and 6B: Authentication with Initial 3D Models and Deformed 3D Models

FIG. 6A is a schematic of a graphical user interface 600 for automatically capturing training data based on an initial 3D model, and FIG. 6B is a schematic of a graphical user interface 620 for automatically capturing training data based on a deformed 3D model, in accordance with some implementations.

As shown, the GUI 600 includes a main portion 601, the model 501, submission button 605, as well as descriptors including descriptor 606, descriptor 608, descriptor 610, and descriptor 612. Similarly, the GUI 620 includes the main portion 601, the deformed model 502, as well as descriptors including descriptor 606, descriptor 608, descriptor 610, and descriptor 612. An additional descriptor 614 is also included.

A user presented with the GUI 600 may select any descriptor, and a user presented with the GUI 620 may also select any descriptor. In some implementations, a user is requested to select a specific number of descriptors (e.g., three). Thereafter, through selection of the submission button 605 the associated selections may be transmitted to the virtual experience server 102 and/or authentication service 130/130*b*. Thereafter, if the respective selections are shared by a threshold number of stored selections from other users, the users of the GUIs 600 and 620 may be authenticated. Furthermore, weights associated with the correct descriptors may be assigned or updated to improve the quality of the labeled training data 202.

Hereinafter, a method of automatically capturing training data is described in detail with reference to FIG. 7.

Figure 7:
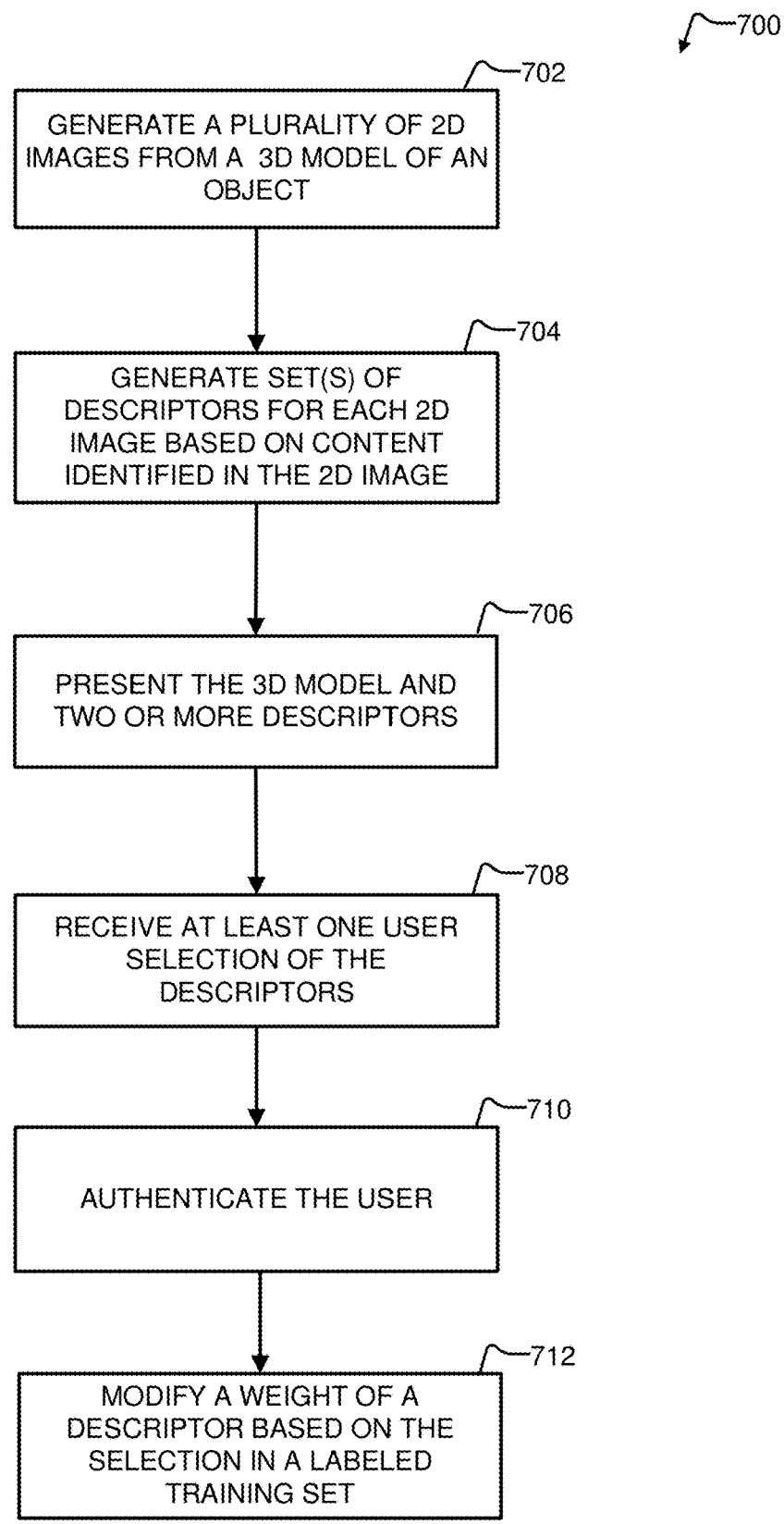
FIG. 7 is a flowchart of an example method of automatically capturing training data, in accordance with some implementations.

FIG. 7: Method of Automatically Capturing Training Data

FIG. 7 is a flowchart illustrating example method 700 of automatically capturing training data, in accordance with some implementations.

In some implementations, method 700 can be implemented, for example, on a server 102 described with reference to FIG. 1 and FIG. 2. In some implementations, some or all of the method 500 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 700. In some examples, a first device is described as performing blocks of method 700. Some implementations can have one or more blocks of method 700 performed by one or more other devices (e.g., other client devices or server devices) that can send results or data to the first device.

In some implementations, the method 700, or portions of the method, can be initiated automatically by a system. In some implementations, the implementing system is a first device. For example, the method (or portions thereof) can be periodically performed, or performed based on one or more particular events or conditions, e.g., a time since last authentication exceeding a threshold, a number of login attempts exceeding a threshold, a predetermined time period having expired since the last performance of method 700 for a particular 3D model or user, and/or one or more other conditions occurring which can be specified in settings read by the method.

Method 700 may begin at block 702. At block 702, a plurality of 2D images may be generated from a 3D model. For example, an image recognition algorithm may generate the 2D images responsive to the 3D model 204 being provided as input, or responsive to a user of client device 110 requesting authentication. Each of the generated 2D images may be generated from a unique perspective of viewing of the 3D model. Furthermore, at least six (6) unique 2D images may be generated, in one implementation. Block 702 is followed by block 704.

At block 704, a respective set of descriptors for each 2D image is generated by the ML model. The respective set of descriptors is based on content identified in the associated 2D image. For example, color, size, texture, shape, type, and other content may be identified and used to generate the descriptors. Other features and content are also applicable. Block 704 is followed by block 706.

At block 706, the 3D model and two or more descriptors are presented to a user in a user interface (e.g., GUI 400, 600, or 620). The two or more descriptors may include at least first descriptors from at least one of the respective sets of descriptors generated at block 704. The two or more descriptors may also include at least one descriptor not in any of the respective sets of descriptors. In this manner, both descriptors generated for the received 3D model and at least one descriptor not previously associated with the 3D model may be presented in the GUI. As such, the user may select from those descriptors for an authentication request as described above. Block 706 is followed by block 708.

At block 708, at least one selection from the two or more descriptors is received from the user interface (e.g., GUI 400, 600, or 620). The at least one selection is selected by a user as being related to the presented 3D model. Furthermore, the at least one selection is selected by a user based on a display of the 3D model that allows the user to actively manipulated, rotate, pan, zoom, or otherwise affect the display of the 3D model without deforming the 3D model from the presented state. The user may select or depress or click on a submission button to facilitate the transmission of the at least one selection from the user interface to an authentication service (e.g., authentication service 130). Block 708 is followed by block 710.

At block 710, the user is authenticated, based on the at least one selection. For example, the authentication service 130 may determine that the at least one selection is shared by a threshold number of users that have been previously authenticated. As an additional example, the authentication service 130 may determine that the at least one selection comprises an associated weight or confidence level that exceeds a threshold. Other suitable authentication techniques may also be applicable. Block 710 is followed by block 712.

At block 712, a weight of at least one descriptor in a labeled training set is modifying based on the at least one selection. For example, if the user is successfully authenticated, a weight of at least one descriptor matching the at least one selection may be increased. For example, if the user is not successfully authenticated, a weight of at least one descriptor matching the at least one selection may be decreased. Other modifications to weights may be applicable, including comparisons amongst a corpus of prior stored selections to determine an appropriate magnitude of modification for associated weights of descriptors.

Additionally, for deformed models, selection of descriptors will result in new ground truth labels. Another method of assigning new weight(s) to existing descriptor(s) would be a function of selection order and existing descriptor weight, e.g. new weight=(1−(existing weight/(existing weight+selection order)))+existing weight.

For example, if a user selects a descriptor with existing weight of 200 as first choice, then new weight=(1−(200/(200+1)))+200=200.004. Similarly, if a user selects a descriptor with existing weight of 200 as third choice, new weight=(1−(200/(200+3)))+200=200.014. The weight of an associated descriptor is not decreased in these examples, instead a threshold for weight is set, below which a descriptor is considered irrelevant. The threshold could also be a mean of the weights of all the associated descriptors.

Blocks 702-712 can be performed (or repeated) in a different order than described above and/or one or more blocks can be omitted. Method 700 can be performed on a server (e.g., 102 or 118) and/or a client device (e.g., 110). Furthermore, portions of the method 700 may be combined and performed in sequence or in parallel, according to any desired implementation.

As described above, an online virtual experience platform may leverage both automated classification techniques and a user authentication process to bolster and/or automatically capture training data based on user-generated content, 3D models, and other 3D content. For example, the online virtual experience platform may present 3D models to both: authenticate a user; and receive user selections that can further be used to alter weights of labeled training data, create new labeled training data, and other suitable uses.

Hereinafter, a more detailed description of various computing devices that may be used to implement different devices and/or components illustrated in FIGS. 1-2 is provided with reference to FIG. 8.

Figure 8:
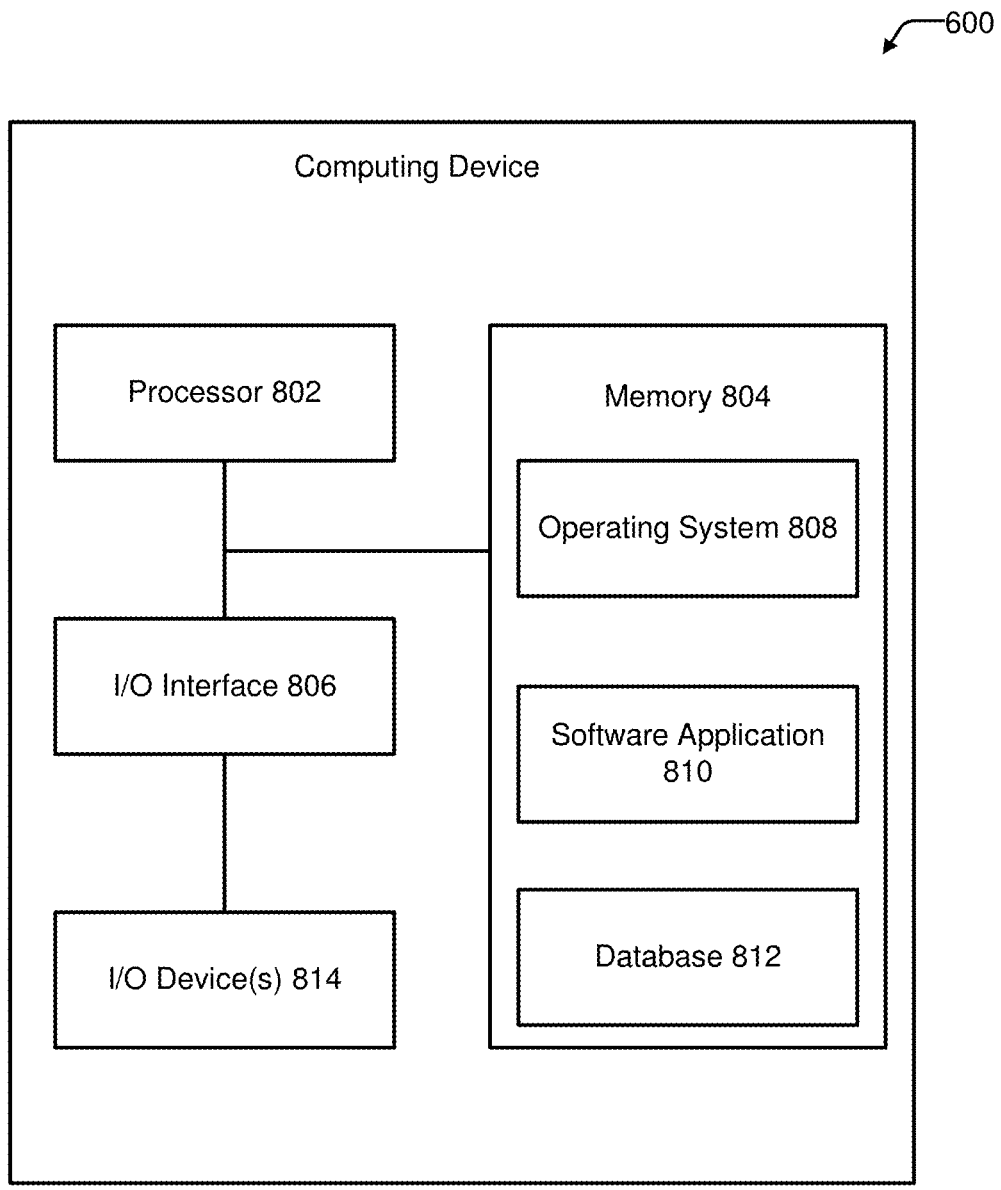
FIG. 8 is a block diagram illustrating an example computing device, in accordance with some implementations.

FIG. 8 is a block diagram of an example computing device 800 which may be used to implement one or more features described herein, in accordance with some implementations. In one example, device 800 may be used to implement a computer device, (e.g., 102, 110 of FIG. 1 and FIG. 2), and perform appropriate operations as described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, headphones, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, software application 810 and associated data 812. In some implementations, the applications 810 can include instructions that enable processor 802 to perform the functions described herein, e.g., some or all of the method of FIG. 7. Software application 810 may include some or all of the functionality required to capture training data and authenticate users, as described above, and/or present graphical user interface(s) (GUI) associated with display of 3D models to capture training data and authenticate users. In some implementations, one or more portions of software application 810 may be implemented in dedicated hardware such as an application-specific integrated circuit (ASIC), a programmable logic device (PLD), a field-programmable gate array (FPGA), a machine learning processor, etc. In some implementations, one or more portions of software application 810 may be implemented in general purpose processors, such as a central processing unit (CPU) or a graphics processing unit (GPU). In various implementations, suitable combinations of dedicated and/or general purpose processing hardware may be used to implement software application 810.

For example, software application 810 stored in memory 804 can include instructions for authenticating users, for displaying/presenting 3D models and associated descriptors, and/or other functionality. Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808 and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online server 102 are described as performing operations as described in some implementations herein, any suitable component or combination of components of online server 102, or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
    generating a plurality of two-dimensional (2D) images from a three-dimensional (3D) model of an object;
    generating a respective set of descriptors for each 2D image of the plurality of 2D images, wherein the respective set of descriptors is based on content identified in the associated 2D image;
    presenting, in a user interface, the 3D model and two or more descriptors, wherein the two or more descriptors include at least first descriptors from at least one of the respective sets of descriptors and at least a second descriptor not in any of the respective sets of descriptors;
    receiving, from the user interface, at least one selection from the two or more descriptors;
    authenticating the user based on the at least one selection; and
    modifying a weight of at least one descriptor associated with the at least one selection for an associated 2D image in a labeled training set for an artificial intelligence (AI) model.

2. The computer-implemented method of claim 1, wherein generating the respective set of descriptors comprises generating, with an image recognition algorithm, the respective set of descriptors, wherein the computer-implemented method further comprises:
    receiving, as output from an image recognition algorithm, a confidence metric associated with descriptors of the respective sets of descriptors; and
    selecting the at least the first descriptors from at least one of the respective sets of descriptors based on the confidence metric of each of the at least first descriptors meeting a threshold.

3. The computer-implemented method of claim 2, further comprising:
applying weights to each descriptor of the respective sets of descriptors based on respective confidence metrics, wherein the applied weights are normalized numerical values within a predefined range.

4. The computer-implemented method of claim 3, further comprising:
calculating a similarity index between the first 3D model and one or more additional 3D models based on the applied weights; and
selecting the at least the first descriptors based on the similarity index.

5. The computer-implemented method of claim 1, wherein presenting the 3D model and the two or more descriptors comprises:
deforming the 3D model to alter at least one aspect of an appearance of the 3D model prior to presenting the 3D model.

6. The computer-implemented method of claim 1, wherein the object is a virtual object that can be deployed in a virtual environment.

7. The computer-implemented method of claim 1, wherein generating the plurality of two-dimensional (2D) images from the three-dimensional (3D) model of the object comprises generating each 2D image based on a respective viewing angle from which the 3D model of the object is viewed.

8. The computer-implemented method of claim 1, wherein the 3D model comprises one or more 3D features, and wherein the one or more 3D features comprise one or more of: a texture or a mesh.

9. The computer-implemented method of claim 1, wherein the receiving the at least one selection is responsive to an authentication request for a user.

10. The computer-implemented method of claim 1, wherein modifying the weight of the at least one descriptor comprises:
determining that the at least one selection is a correct descriptor; and
applying a new weight to the correct descriptor.

11. The computer-implemented method of claim 10, wherein determining that the at least one selection is the correct descriptor comprises:
storing a plurality of selections received from a plurality of users viewing the 3D model; and
determining that the at least one selection is correct if the at least one selection matches at least a threshold number of the stored plurality of selections.

12. The computer-implemented method of claim 1, wherein the AI model is trained to generate descriptors for 3D models by using the labeled training set.

13. The computer-implemented method of claim 11, further comprising:
providing a plurality of 3D models to the AI model, each 3D model associated with a respective object associated with a virtual experience;
receiving a plurality of virtual experience descriptors for the virtual experience as an output from the AI model, wherein the AI model generates the plurality of virtual experience descriptors based on the plurality of 3D models; and
matching the plurality of virtual experience descriptors to identify different virtual experiences from a virtual experience platform having similar descriptors.

14. The computer-implemented method of claim 13, further comprising one or more of:
assigning an age-specific content rating associated with the virtual experience based on the matching;
restricting access to the virtual experience based on the matching;
flagging the virtual experience for administrator review based on the matching;
adjusting a search ranking of the virtual experience based on the matching; or
assigning a classification to the virtual experience based on the matching.

15. The computer-implemented method of claim 1, wherein each descriptor is descriptive of at least one of: a shape of the 3D model, color of the 3D model, material of the 3D model, classification of the 3D model, or a type of object represented by the 3D model.

16. A system, comprising:
a memory with instructions stored thereon; and
a processing device, coupled to the memory, the processing device configured to access the memory, wherein the instructions when executed by the processing device, cause the processing device to perform operations including:
generating a plurality of two-dimensional (2D) images from a three-dimensional (3D) model of an object;
generating a respective set of descriptors for each 2D image of the plurality of 2D images, wherein the respective set of descriptors is based on content identified in the associated 2D image;
presenting, in a user interface, the 3D model and two or more descriptors, wherein the two or more descriptors include at least first descriptors from at least one of the respective sets of descriptors and at least a second descriptor not in any of the respective sets of descriptors;
receiving, from the user interface, at least one selection from the two or more descriptors;
authenticating the user based on the at least one selection; and
modifying a weight of at least one descriptor associated with the at least one selection for an associated 2D image in a labeled training set for an artificial intelligence (AI) model.

17. The system of claim 16, wherein generating the respective set of descriptors comprises generating, with an image recognition algorithm, the respective set of descriptors, and wherein the operations further comprise:
receiving, as output from an image recognition algorithm, a confidence metric associated with descriptors of the respective sets of descriptors; and
selecting the at least the first descriptors from at least one of the respective sets of descriptors based on the confidence metric of each of the at least first descriptors meeting a threshold.

18. The system of claim 17, wherein the operations further comprise:
applying weights to each descriptor of the respective sets of descriptors based on respective confidence metrics, wherein the applied weights are normalized numerical values within a predefined range.

19. The system of claim 18, wherein the operations further comprise:
calculating a similarity index between the first 3D model and one or more additional 3D models based on the applied weights; and selecting the at least the first descriptors based on the similarity index.

20. A non-transitory computer-readable medium with instructions stored thereon that, responsive to execution by a processing device, causes the processing device to perform operations comprising:
- generating a plurality of two-dimensional (2D) images from a three-dimensional (3D) model of an object;
- generating a respective set of descriptors for each 2D image of the plurality of 2D images, wherein the respective set of descriptors is based on content identified in the associated 2D image;
- presenting, in a user interface, the 3D model and two or more descriptors, wherein the two or more descriptors include at least first descriptors from at least one of the respective sets of descriptors and at least a second descriptor not in any of the respective sets of descriptors;
- receiving, from the user interface, at least one selection from the two or more descriptors;
- authenticating the user based on the at least one selection; and
- modifying a weight of at least one descriptor associated with the at least one selection for an associated 2D image in a labeled training set for an artificial intelligence (AI) model.

* * * * *